Nov. 19, 1963  S. A. WEBER ETAL  3,111,394
APPARATUS FOR TREATING CHEMICAL COMPOUNDS
Filed March 13, 1959
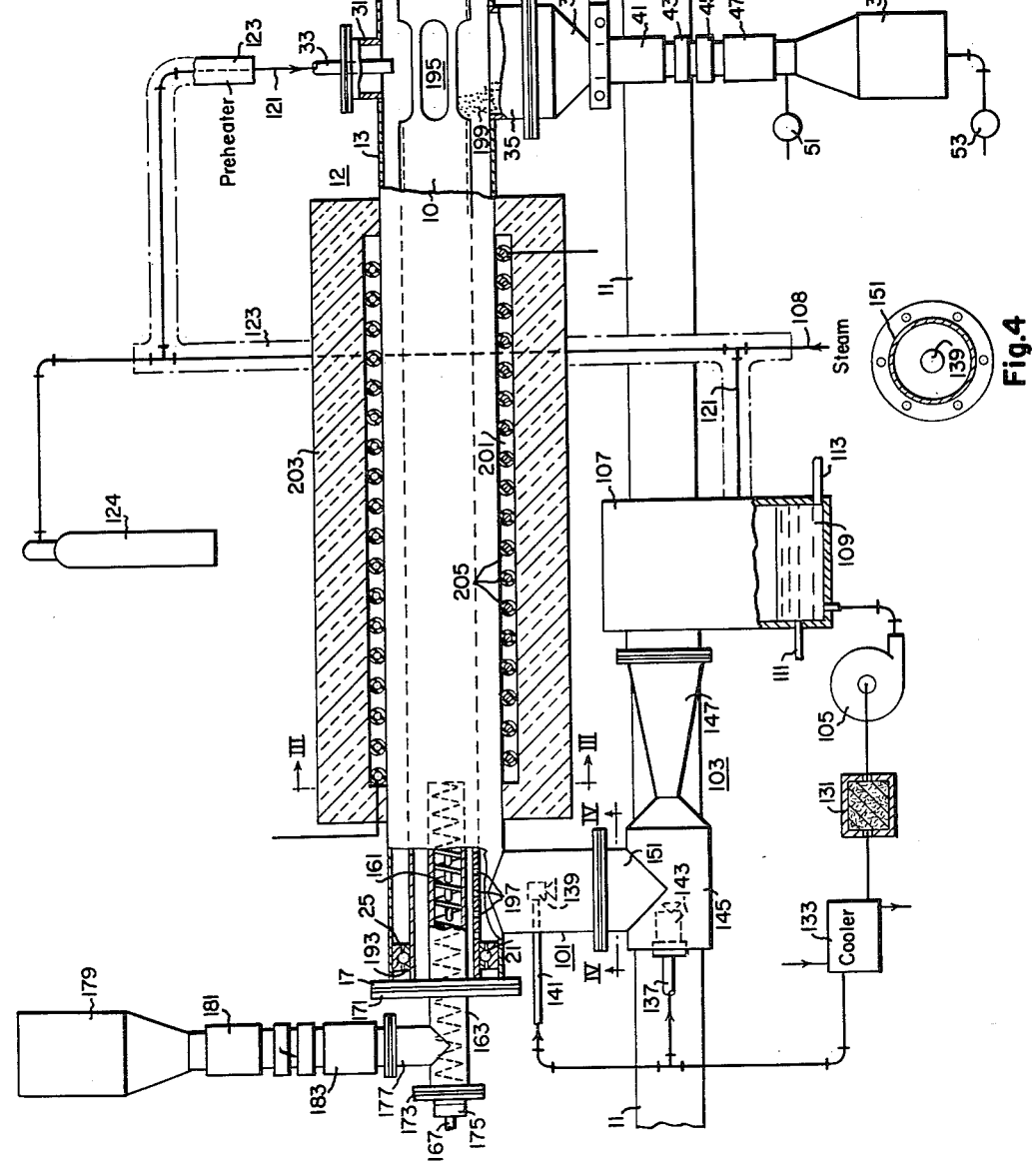

United States Patent Office

3,111,394
Patented Nov. 19, 1963

3,111,394
APPARATUS FOR TREATING CHEMICAL COMPOUNDS
Sylvester A. Weber and Robert M. Connelley, Murraysville, Pa., assignors to Nuclear Materials and Equipment Corporation, Apollo, Pa., a corporation of Pennsylvania
Filed Mar. 13, 1959, Ser. No. 799,240
10 Claims. (Cl. 23—279)

This invention relates to the art of treating chemical compounds to convert them from one composition to another and has particular relationship to the carrying out of such conversion as a continuous process.

In its specific aspects this invention concerns itself with the treatment of material with dangerous gases (explosive or toxic gases) or in such a way that dangerous gases may be emitted, and it is an object of this invention to provide a method and apparatus for carrying out such treatment without danger to the personnel employed in the treatment or so that the personnel who may later use the converted material may not be endangered.

A typical industrial process with which this invention concerns itself is the conversion of higher uranium oxides ($UO_3$ or $U_3O_8$) into uranium dioxide ($UO_2$) by treating the higher oxide usually in granular form with hydrogen. Likewise, the higher oxides of molybdenum or tungsten ($MoO_3$ or $WO_3$) or ammonium molybdenate or ammonium tungstate could be reduced by treatment with hydrogen. Another process of industrial importance to which this invention is applicable is the conversion of uranium dioxide into uranium hexafluoride ($UF_6$). This process may be performed in two steps: first, the oxide is converted into uranium tetrafluoride with hydrogen fluoride and then the tetrafluoride is converted into the hexafluoride with fluorine. The reactions may be defined as follows:

$$UO_2 + 4HF \rightarrow UF_4 + 2H_2O$$
$$UF_4 + F_2 \rightarrow UF_6$$

There are also conversions involving treatment with such gases as carbon monoxide, chlorine or the like.

The above-described processes involve explosive or toxic gases. Since it is necessary to derive substantial quantities of the product of the reaction from these processes, substantial quantities of the gases are used.

It is then an object of this invention to provide apparatus involving no danger to personnel for treating material with substantial quantities of toxic or explosive gases.

It is a specific object of this invention to provide apparatus for converting the higher oxides of uranium into uranium dioxide.

The conversion of higher oxides of uranium into lower oxides of uranium is of partciular interest because it presents peculiar problems involving toxic and explosive gases and it is desirable to consider this conversion in detail. The higher uranium oxides available for conversion include not only the $UO_3$ and the $U_3O_8$ but uranium oxyfluoride $UO_2F_2$ and uranium tetrafluoride $UF_4$. It is essential that these fluoride compounds be removed during the treatment so that the product of the treatment, uranium dioxide, includes no fluoride.

In the practice of this invention the fluorides are removed by treating the raw material not only with hydrogen but also with water vapor. The vapor converts the fluorides into hydrogen fluoride. The following reactions take place between the vapor and the fluorides:

$$UO_2F_2 + H_2O \rightarrow UO_3 + 2HF$$
$$UF_4 + 2H_2O \rightarrow UO_2 + 4HF$$

The uranium trioxide is reduced to uranium dioxide by the hydrogen and the hydrogen fluoride is dissolved out by water.

So that the removal of the fluorides is effective, the hydrogen and vapor must be continuously renewed and this is effected in accordance with the invention by causing a mixture of hydrogen and water vapor to flow over the material being treated. Specifically, the material is moved from a position where it is delivered in raw form to a position in which the product of the treatment or reaction is collected and the hydrogen and water vapor are moved in the direction opposite to the material. It is usually desirable to treat the material at a substantial rate and the hydrogen and vapor must then flow at a relatively high rate. In a typical situation, hydrogen flows over the material at the rate of 40 to 45 cubic ft./min.

The practice of this process then involves a highly explosive gas, hydrogen, and a deadly toxic gas, hydrogen fluoride, and it is essential that any appreciable leakage of these gases be avoided.

It is a specific object of this invention to provide apparatus for carrying out the above-described treating process or a like process without danger to personnel from the gases.

Only a relatively small proportion of the large volume of hydrogen being circulated in the above-described process is consumed in the reaction. Excess hydrogen in analogous situations may be disposed of by burning. But this expedient is not practical in the process under consideration because of the large volume of the gas to be burned. In addition, the cost of the burned gas is high.

It is then a further specific object of this invention to provide apparatus for practicing the above-described process in the use of which the gas not consumed in the reaction shall be usefully employed and shall not be burned or otherwise destroyed.

In accordance with a specific aspect of this invention, a rotating kiln is provided including a gas-tight encloseure having gas-tight bearing means.

A container for advancing the material to be treated is rotatably mounted on the bearing means and is rotated by a drive outside of the enclosure. The container may be suspended from stub shafts of relatively small diameter so that the bearing seals may be relatively small presenting no leakage problem. The enclosure is provided with a material inlet through which raw material is supplied through air-lock valve means and an outlet from which the product of the treatment is derived through air-lock valve means. The inlet and the outlet are in communication with the rotatable container so that the material may be advanced by the container from the inlet to the outlet.

The container also includes a gas inlet through which gas, for example hydrogen, is admitted and a gas outlet. The gas inlet and outlet are, in accordance with this invention, interconnected in a gas-circulating system through which the hydrogen not consumed in the reaction is circulated. The excess hydrogen is not wasted by burning but is reacted with material. To replenish the reacted hydrogen, fresh hydrogen is injected into the circulating system.

The circulation is effected by pumping means which, in accordance with an important aspect of this invention, is a water aspirator. The water in the aspirator is maintained at a moderately elevated temperature so that it is vaporized to a substantial extent. The circulating system is in addition heated between the aspirator and the gas inlet. The circulating hydrogen then carries with it a substantial portion of vapor from the aspirator. The aspirator then not only circulates the hydrogen but provides water vapor for the reaction. In addition, the water in the aspirator serves to absorb the hydrogen fluoride. The hydrofluoric acid formed is deposited in a pool from which it is continuously drawn off and replaced by fresh water.

The unit consisting of the enclosure and the circulating system is readily made gas-tight. Since the bearing seals are small, they involve no leakage problem. The admission of raw material and the extraction of the product of the reaction is through air-lock valves. There is then no appreciable leakage of dangerous gas.

The apparatus described above lends itself advantageously to the treatment of material with dangerous gases and this adaptation of the apparatus is one of the important specific aspects of this invention. In accordance with the broader aspects of this invention, the enclosure may be evacuated and may thus serve for vacuum treatment or vacuum heating or drying. Thus, the apparatus when evacuated may serve for the dehydration of the rock of which cement is formed. The dehydration in a vacuum may be carried out without the usual losses arising from the circulation of air through the crumbling rock. Where a relatively high vacuum is required in such treatment the water aspirator may be replaced by a pump or by an adequate pumping system.

The novel features considered characteristic of this invention are disclosed generally above. The invention itself, both as to its organization and as to its method of operation, together with the objects and advantages thereof, will be understood from the following description of a specific embodiment when taken in connection with the accompanying drawings, in which:

FIGURE 1 is a view partly in longitudinal section and partly with parts broken away showing a preferred embodiment of this invention;

FIG. 2 is a view in section showing a bearing seal used in the practice of this invention;

FIG. 3 is a transverse section taken along line III—III of FIG. 1; and

FIG. 4 is a transverse section along line IV—IV of FIG. 1.

For the purpose of aiding the explanation of the invention by reference to concrete subject matter, the drawing shows a kiln system for converting higher uranium oxides into uranium dioxide. This showing is adapted only to aid those skilled in the art in practicing the invention and not with any intention of limiting the scope of the invention.

The apparatus includes a support 11 which may be a channel beam on which an enclosure 12 is supported. Within the enclosure a tube 10 through which the raw material is advanced, is rotatably supported. This enclosure 12 is an elongated generally cylindrical tube 13 terminating at the ends in flanges 15 and 17. Near each flange 15 and 17 the fixed races 19 and 21 of ball bearings 23 and 25, respectively, are mounted. The support 11 is pivotally supported at the end adjacent the flange 15 and may be pivoted upwardly or downwardly at the other end.

Displaced inwardly from the bearing 23, the tube 13 has a flanged cylindrical projection 31 which serves as inlet for the reactive gas, the hydrogen and water vapor in the case at hand. This gas is supplied through a tube 33 which extends into projection 31 through a gas-tight packing gland such as suitably positioned and compressed O-rings (not shown).

Another flanged projection 35 of larger diameter than the projection 31 extends from the enclosure 13 oppositely to the tube 31. The projection 35 serves as the outlet for the product of the reaction, uranium dioxide. This product is derived through a flanged hopper 37, the flange of which is connected to the flange of the projection 35 through gas-tight packing. In the practice of the invention, the hopper 37 is connected through an air-lock valve unit to a container 39 which receives the uranium dioxide. The air-lock valve unit includes a ball valve 41 (which may be a Jamesbury ball valve made by Jamesbury Corp. of 64 Millbrook Street, Worcester 5, Massachusetts) and one of the cooperative parts 43 of a coupler (which may be a Kamlock coupler made by OPW Corp. of Cincinnati 5, Ohio). The other cooperative part 45 of the coupler and another ball valve 47 are mounted on the container 39.

In the practice of this invention, the coupling between the part 43 and the part 45 on a container 39 which is to receive the uranium dioxide is effected as follows. During operation the valves 41 and 47 are opened and the uranium dioxide flows into the container 39. When the container is filled both valves are closed and the container is flushed with nitrogen through valve tubes 51 and 53 connected to its top and bottom. The part 45 is then disconnected and the bottle 39 replaced by another bottle.

The flange 15 is connected to a gas-tight bearing assembly (FIG. 2). This assembly includes a threaded flange stud 61, the flange 63 of which is bolted to the flange 15 through suitable packing. The threaded projection 65 of the stud 61 is counterbored and Teflon washers 67 are disposed in the counterbore 69. The washers 67 are compressed by screwing on the projection 65 a cylindrical nut 71 internally threaded at its end. The nut has a projection 73 which engages the washers 67. A stud shaft 75 extends through the flange 15, the stud 61 and the nut 71. The shaft 75 has a rectangular or square tip 77 which engages a disc 79 near the end of tube 10 in driving relationship. At the other end the shaft 75 carries a sprocket wheel 81 through which it is driven from a motor 83 through a chain 85.

The nut 71 compresses the Teflon washers 67 causing them to deform and engage the shaft 75 firmly. The joint between the shaft 75 and the washers 67 is then gas tight.

The tube 13 is supported from the channel 11 on a roller 91 which engages a projection 93 extending from the channel 11. The motor 83 is anchored to the enclosure 12 and is similarly supported on the channel 11 on rollers 95. The rollers 91 and 95 permit the end of the enclosure 12 adjacent the motor 83 and the motor 83 to move as the enclosure 12 expands and contracts as it is heated and cooled.

At the end adjacent flange 17 the tube 13 includes a flanged cylindrical projection 101 which serves as outlet for hydrogen and water vapor. This tube 101 is connected to an aspirator and water pumping system 103 which causes the hydrogen and water vapor to circulate.

The aspirator 103 includes a water pump 105 connected to a separating container 107 where the hydrofluoric acid is scrubbed out. The container 107 includes a pool 109 in its base which is continuously supplied with fresh water through a tube 111 and from which the acidic water flows through a tube 113. The flow of water and acidic water through tubes 111 and 113 is such that the water in the pool 109 is maintained at a very low acidic concentration.

The container 107 communicates with the gas tube 33. The connection 121 between the container 107 and the tube 33 is enclosed in a preheater 123 which maintains the vapor and spray drawn from 107 into tube 33 in vaporized state. The preheater 123 extends substantially along the whole length of the container 121. The hydrogen consumed in the reaction is replenished by injection in the connection 121 from a supply 124. Water vapor may also be injected through connection 108.

The pump causes the water from the pool 109 to flow through a filter 131 and a cooler 133 to a pair of spray channels 135 and 137 in parallel. Channel 135 terminates in a spray nozzle 139 suspended generally centrally in the projection 101 on the tube 141 conducting the water. The spray from the nozzle 139 cools the gas received in the projection 101. The other channel 137 terminates in a spray nozzle 143 extending into a generally cylindrical tube 145 which communicates with a Venturi tube 147. The tube 145 has a flanged projection 151 which is joined through a gas-tight joint with the projection 101. The Venturi tube 147 is joined through a gas-tight joint to the upper portion of the separator 107. The spray assembly 143—145—147 serves as a gas scrubber, the high velocity stream passing out of the exit of the Venturi tube mixing thoroughly with the gas and removing the hydrogen fluoride. The pump 105, container 107, the sprays 139 and 143 and the other connecting parts such as 101, 141, 145, 147 are composed of material such as stainless steel which is resistant to hydrofluoric acid.

A feedscrew 161 extends through the flange 17 into the tube 10. The screw 161 includes a cylindrical shell 163 having a T-joint near its outer end. The thread of the screw is in a shaft 167 and is rotatable within the shell 163. The shell 163 has an intermediate flange 171 which is joined gas tight to the flange 17. The shell 163 also has an end flange 173 which carries a sealed bearing 175 similar to the bearing on flange 15 which is shown in detail in FIG. 2. The shaft 167 passes through this bearing and is driven from a motor (not shown). The stem 177 at the T-joint is flanged and is joined to a supply container 179 from which the higher uranium oxides are derived in granulated form through a gas-lock valve unit similar to that connected to the container 79.

In operation the valves 181 and 183 of this gas-lock are opened and the granular raw material is fed to the screw under gravity. The screw feeds the material through the shell into the tube 10.

The tube 10 carries at its ends the running races 191 and 193 of bearings 23 and 25 and is rotated by motor 83 on these bearings. The tube 10 has openings 195 which extend over the hopper 37. The tube 10 has perforations 197 at the other end over the projection 101. The perforations 197 are spaced from the position of tube 10 where the raw material 199 is delivered by the screw 161. The gas flows in through openings 195 along the tube 10 and out through perforations 197. It is drawn by the action of the aspirator 103.

The material 199 is heated to the temperature of the reaction by a hollow cylindrical heater 201 including a tube 203 of insulation which encircles the enclosure 12. Between the tube 203 and the enclosure there are heating coils 205. The heater extends along the whole path of the material 199.

The channel 11 is so set that the tube 10 and enclosure 11 are inclined at a small angle to the horizontal with the end of flange 15 lower than the end of flange 17.

In the use of the apparatus the material 199 is fed by the screw 161 into tube 10. As tube 10 is rotated the material is tumbled along tube 10 towards openings 195. At the same time the hydrogen and the water vapor which the hydrogen derives from container 107 flows up tube 10 permeating and reacting with the tumbling material 199. The higher oxides are reduced and the fluorides are converted into hydrogen fluoride which is swept by the stream of hydrogen and vapor towards the openings 197 and passes through these openings into the aspirator 103 where the hydrogen fluoride is dissolved out. Only two small rotary seals 61—71 and 175 are present and the enclosure 12 is entirely gas tight. There is no danger of leakage of hydrogen or fluorine. Since the gas is circulated no problem of disposing of the hydrogen arises.

While a preferred embodiment of this invention has been disclosed herein, many modifications thereof are feasible. This invention then is not to be restricted except insofar as is necessitated by the prior art.

We claim as our invention:

1. A rotary kiln for treating material with dangerous gases or in such a way that dangerous gases are emitted comprising a container through which said material is to be fed, a solid shaft extending externally from one end of said container and including means connected to said container for rotating said container with said shaft, means connected to said shaft for rotating said shaft and said container to advance said material along said container, and a gas-tight enclosure enclosing said container and cooperative with said shaft to prevent flow of said dangerous gases to the region outside of said enclosure.

2. A rotary kiln for treating material with gas including water vapor comprising an enclosure having spaced gas inlet and gas outlet means, a member for conveying material to be treated rotatably mounted between, and in communication with, said inlet and outlet means, a conductor for said treating gas connected to said inlet means, water actuable gas pumping means connected to said outlet means and to said conductor to cause said gas to circulate through said member and through said conductor, and heating means cooperative with said conductor to vaporize water from said pumping means flowing in said conductor so that said circulating gas includes water vapor.

3. A rotary kiln for treating material with gas including water vapor comprising an enclosure having spaced gas inlet and gas outlet means, a member for conveying material to be treated rotatably mounted between, and in communication with, said inlet and outlet means, a conductor for said treating gas connected to said inlet means, water actuable gas pumping means connected to said outlet means and to said conductor to cause said gas to circulate through said member and through said conductor, and heating means cooperative with said conductor to vaporize water from said pumping means flowing in said conductor, said heating means including a heater encircling in heating relationship substantially all of said conductor between said pumping means and said inlet means.

4. A rotary kiln particularly for treating material with dangerous gases or in such a way that dangerous gases are emitted comprising a gas-tight enclosure having therein gas-tight bearing means, drive means external to said enclosure, shaft means journaled in said bearing means and connected to said drive means to be driven thereby, a container for said material wholly within said enclosure, said container having an input opening and an output opening, each of said openings communicating with said enclosure, material feed means connected to said enclosure and to said container near said input opening for supplying said material to said container, material removal means connected to said enclosure and to said container near said output opening for removing said material from said container, gas inlet means in said enclosure near said output opening in communication with said container for transmitting gas along said container, gas outlet means in said enclosure near said input opening in communication with said container for removing gas from said container, and means connecting said container to said shaft means for rotating said shaft means and said container to advance said material along said container.

5. A rotary kiln particularly for treating material with dangerous gases or in such a way that dangerous gases are emitted comprising a gas-tight enclosure, a container for said material wholly within said enclosure, means connected to said container near one end thereof for feeding said material into said container, said container having at least one opening in the opposite end thereof so that said container is in atmosphere interchange relationship with said enclosure, and means connected to said container for driving said container to advance said material along said container from said one end thereof to said opening.

6. A rotary kiln particularly for treating material with dangerous gases or in such a way that dangerous gases are emitted comprising a generally cylindrical gas-tight enclosure, said enclosure having gas-tight bearings of relatively small dimensions in at least one of the ends thereof, a generally cylindrical container having a solid shaft extending externally from one end thereof, said container being connected to said shaft rotatable therewith on said bearings, and means connected to said container for rotating said container on said bearings to advance said material.

7. A rotary kiln particularly for treating material with dangerous gases or in such a way that dangerous gases are emitted comprising a generally cylindrical gas-tight enclosure, said enclosure having gas-tight bearings of relatively small dimensions in at least one of the ends thereof, a generally cylindrical container rotatably supported on said bearings, the interior of said container being in communication with the interior of said enclosure, means connected to said enclosure for circulating gas through said container and enclosure, and means connected to said container for rotating said container on said bearings to advance said material.

8. A rotary kiln particularly for treating material with dangerous gases or in such a way that dangerous gases are emitted, including material treating and advancing means having an axis about which said treating and advancing means is to rotate and having a rotatable shaft extending from one end thereof along the extension of said axis, a gas-tight enclosure having bearing means having a rotary gas-tight seal, said treating and advancing means being mounted within said enclosure rotatable on said bearing means with said shaft extending through said seal, and driving means external to said enclosure connected to said shaft along said extension and external to said treating and advancing means for rotating said shaft and said treating and advancing means, said enclosure including means communicating with said treating and advancing means for feeding said material to said treating and advancing means and for transmitting gas through said treating and advancing means, said material being advanced through said treating and advancing means by rotation thereof.

9. A rotary kiln particularly for treating material with dangerous gases or in such a way that dangerous gases are emitted, including material treating and advancing means having an axis about which said treating and advancing means is to rotate and having a rotatable stub shaft extending externally to said treating and advancing means along the extension of said axis from one end of said treating and advancing means, a gas-tight enclosure having bearing means having a rotary gas-tight seal, said treating and advancing means being mounted within said enclosure rotatable on said bearing means with said shaft extending through said seal, and driving means external to said enclosure connected to said shaft for rotating said shaft and said treating and advancing means, said enclosure including means communicating with said treating and advancing means for feeding said material to said treating and advancing means and for transmitting gas through said treating and advancing means, said material being advanced through said treating and advancing means by rotation thereof.

10. A rotary kiln particularly for treating material with dangerous gases or in such a way that dangerous gases are emitted comprising material treating and advancing means having an axis about which said treating and advancing means is to rotate, and having a rotatable shaft extending from one end thereof along the extension of said axis, a gas-tight enclosure, gas-tight bearing means in at least one of the ends of said enclosure, means mounting said treating and advancing means rotatably within said enclosure on said shaft with said shaft extending rotatably through said bearing means, means connected to said shaft for rotating said shaft and said treating and advancing means, and means connected to said treating and advancing means for transmitting said material through said treating and advancing means as it is rotated.

References Cited in the file of this patent
UNITED STATES PATENTS

| | | |
|---|---|---|
| 560,742 | Navarro | May 26, 1896 |
| 1,230,343 | Tommasi | June 19, 1917 |
| 2,127,571 | Pardee | Aug. 23, 1938 |
| 2,265,358 | Denning | Dec. 9, 1941 |
| 2,348,673 | Degner | May 9, 1944 |
| 2,507,123 | Sproule et al. | May 9, 1950 |
| 2,587,639 | Miley | Mar. 4, 1952 |
| 2,739,801 | Rankin | Mar. 27, 1956 |
| 2,810,626 | Fowler | Oct. 22, 1957 |
| 2,811,414 | Murphree | Oct. 29, 1957 |
| 2,838,379 | Fischer et al. | June 10, 1958 |
| 2,948,525 | West et al. | Aug. 9, 1960 |